July 1, 1947.
B. K. STUBER
2,423,419
INSERTED BLADE CUTTER
Filed Aug. 31, 1946
3 Sheets-Sheet 1
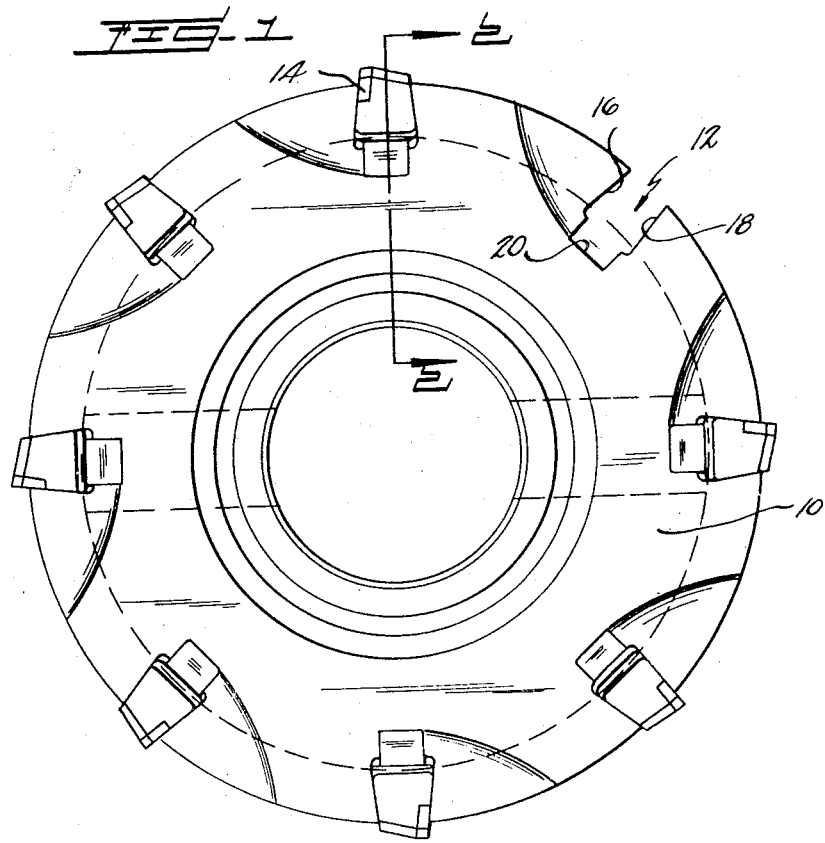
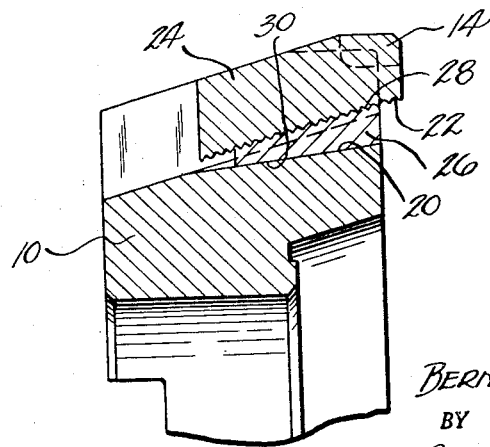
INVENTOR.
BERNARD K. STUBER.
BY
Barnes, Kisselle, Laughlin & Raisch
ATTORNEYS.

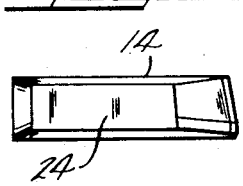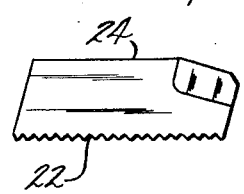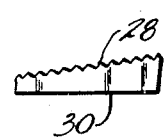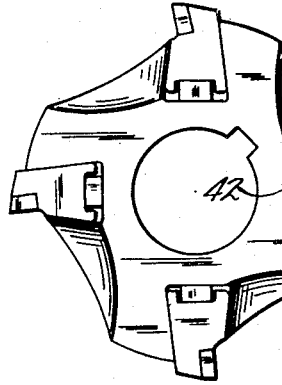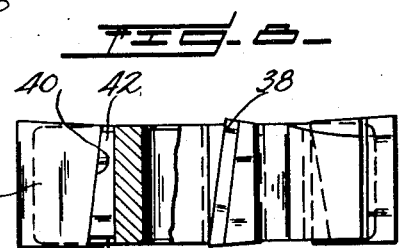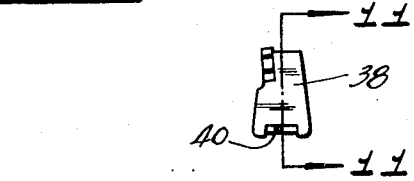

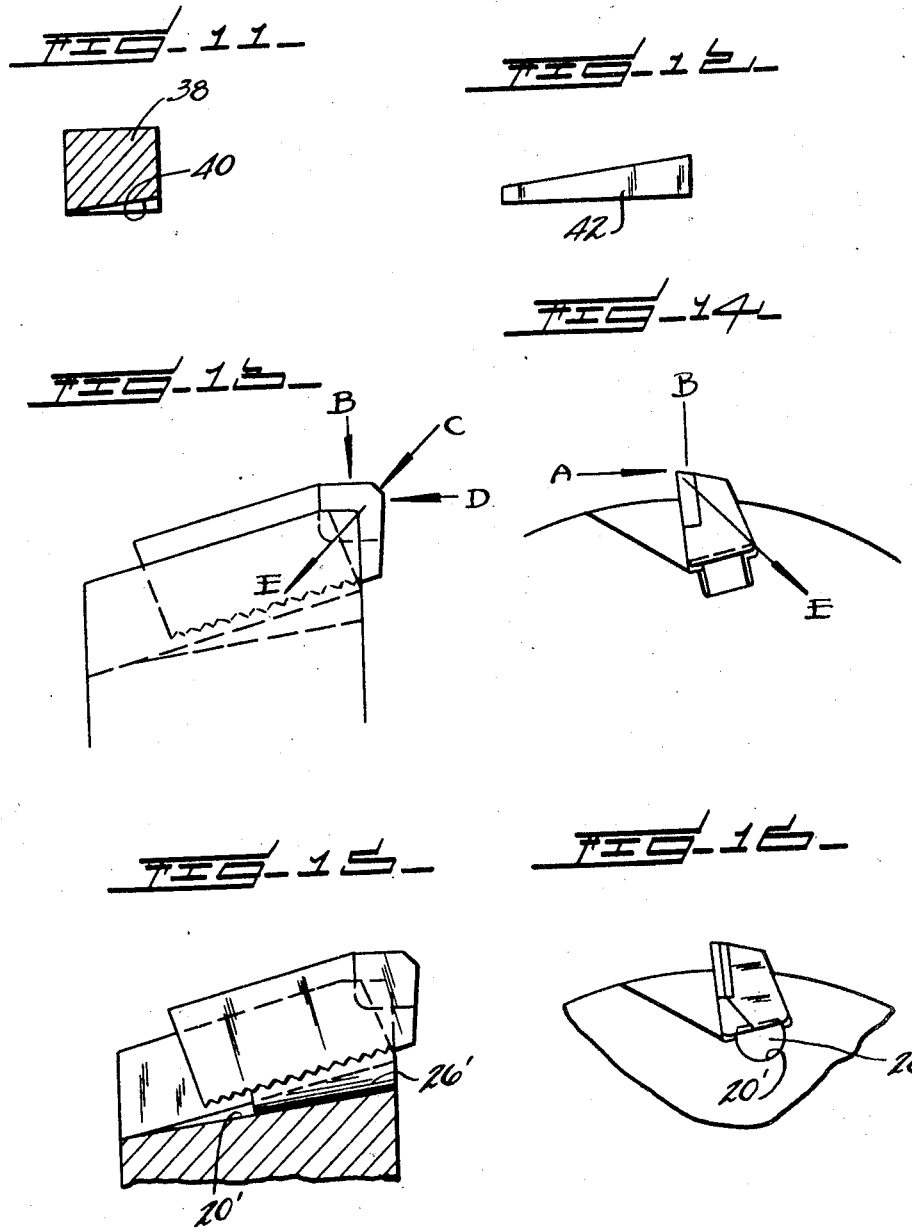

Patented July 1, 1947

2,423,419

UNITED STATES PATENT OFFICE 2,423,419

INSERTED BLADE CUTTER

Bernard K. Stuber, Detroit, Mich.

Application August 31, 1946, Serial No. 694,204

8 Claims. (Cl. 29—105)

This invention relates to an inserted blade cutter, the blades of which may be adjusted to take up wear. With the development of sintered carbide cutting materials, the speeds utilizable in machining metals have increased tremendously and the mechanical loads on cutters using these materials have correspondingly increased. Customarily, a sintered carbide cutting tool is formed from a small piece of the carbide material which is brazed to a rigid steel support which forms the complete cutting blade. The carbide material, while extremely hard, requires very rigid support if it is to have a maximum life between grinds. In fact, the more rigid the support of the carbide element, the faster the cutting speeds and the heavier the feeds that can be used.

It is an object of the present invention to provide an improved inserted blade cutter and blade therefor which provides extremely rigid support for the actual cutting edge of the blade and in which the clutter body may be stronger than bodies heretofore constructed.

Another object is to provide an inserted blade cutter and blade therefor in which the blade receiving slots of the body are economically produced by simple machining operations and which avoids the use of double tapered contours, serrated faces, etc.

It is also an object of the invention to provide an improved cutter of this character wherein the blade is wedged between the front and back sides of the slot in full contact therewith from end to end and without the interposition of a separate wedge and to so form the slot and blade that it may be wedged into contact with the front and back walls by wedge means acting between the bottom of the slot and the blade.

Figure 1 is an end view of a milling cutter embodying one form of the present invention.

Figure 2 is a cross section on line 2—2 of Figure 1.

Figure 3 is a top view of an inserted blade used in the device of Figure 1.

Figure 4 is a side view of the blade of Figure 3.

Figure 5 is an end view of the blade of Figure 3.

Figure 6 is a side view of a wedge used in the device of Figure 1.

Figure 7 is an end view of a cutter embodying a second form of the invention.

Figure 8 is a side view of the cutter of Figure 7.

Figure 9 is a top view of a cutter blade used in the device of Figure 7.

Figure 10 is an end view of the blade of Figure 9.

Figure 11 is a cross section on line 11—11 of Figure 10.

Figure 12 is a side view of a wedge used in the device of Figure 7.

Figure 13 is a diagrammatic view illustrating the loads on the cutter blade viewed from the front.

Figure 14 is a similar diagram viewed from the end.

Figure 15 is a view corresponding to Figure 2 showing a modified form.

Figure 16 is a view corresponding to Figure 1 showing the same modification.

Referring now to Figure 1, there is shown a cutter body 10 of circular form which, as shown, represents a typical face milling cutter. The cutter 10 is provided with a plurality of slots 12 for the reception of inserted blades 14. The slot has an inclined front wall 16 and an inclined back wall 18 which lie in planes which, if extended, would meet in a line parallel to the cylindrical or conical surface swept by the top edge of the blade 14. This line is also parallel to the general axis of the blade. In other words, the front to back thickness of the slot is uniform from end to end; thus this portion of the slot may be formed by a simple broaching operation. The bottom of the slot is provided with a groove 20 which is deeper at one end than it is at the other and, preferably, has an approximately 7 degree angle with respect to the bottom portions of the walls 16 and 18. The cutter blade 14 has a serrated bottom surface 22 parallel to the top surface 24. A tapered wedge 26 has a serrated upper surface 28 at the same 7 degree angle to the bottom surface 30. Both the wedge and the blade may be of uniform width from end to end except that the front and back faces of the blade are inclined to correspond to the inclination of the slot walls 16 and 18. This inclination is also preferably 7 degrees on either side with respect to a radial line midway between them.

It will be seen that when a blade 14 and wedge 26 are placed with their serrations in contact, the two may be driven as a unit into the slot 12 and will be wedged between the sloping walls 16 and 18 by the upward action of the wedge 26 acting in the inclined bottom portion 20 of the slot. The position to which the blade is driven into the slot may be varied by driving it out and placing the wedge further inwardly or outwardly along the serrations 22 and then driving the two members into place again.

The blade is thus held in the slot extremely tightly and is backed up by the solid metal of the cutter body along a large area on both its front and back faces. These slots are uniform in cross section throughout their length and are dovetail shaped with their side walls tapering uniformly from their bottom, narrowing toward the open side along the conical wall of the body. This type slot is easily and accurately reproduced by the broaching method so that uniformity of size and shape of slot is assured thus forming an accurate retainer for the blades. An extended opening toward the axis provides space for a wedge. This opening is formed at a wedging angle to the blade slot, with its deepest portion toward the larger end of the conical body uniformly diminishing in depth towards the small end of the conical body. This wedge slot can also be easily and accurately reproduced by broaching.

One advantage of this construction is that it takes up considerably less circumferential space than in the conventional construction where the wedge is placed in front or in back of the blades. Thus more blades can be fitted into a given cutter body and maintain the same body strength or, as I suggest, the same number of blades be used as in the conventional design leaving a much greater body section between blades greatly strengthening the body, thereby permitting it to carry these extra heavy shock loads experienced when milling with sintered carbide. With all of the blades and wedges tightly in place, they co-act with the body forming substantially a solid one piece unit so near to a solid cutter that they re-act as one yet retaining the adjustable features of an inserted blade cutter.

Vibration has also been reduced due to the small over hang portion of the blade, thus greatly reducing the bending strains and tensile loads imparted to the blades. This design of blade further reduces these loads because of its peculiar shape. The cutting loads are numerous (see Figures 13 and 14), one, "A" caused by chip pressure against the blade, another "B" caused by the feeding of the cutter into the metal, another "C" the corner angle load, another "D" causing the cutter to try to back away from the work being machined, all combining into a resultant load "E" in the approximate direction shown, diagonally across the blade from the top cutting edge toward the lower trailing edge of the blade.

Thus the load is carried through the maximum section of the blade, its strongest point. The usual rectangular or V type blade would be much shorter, therefore, weaker through this section. A given bending moment in inch pounds caused by the cutting action on this type blade results in a greatly reduced tensile or pound load at the cutting edge because of the increased section length in inches. A greater compressive strength or backing is provided in the direction of resultant load than that provided by a rectangular blade. The resultant load is imparted to the body at the vertex of the corner angle, thus forming the best known static condition, assuring no tendency for the blade to move in any direction. Likewise, this design of blade requires the least amount of material to give the greatest strength along the line of the resultant load.

Referring now to the modified form of the cutters illustrated in Figures 7 through 12, there is illustrated a simplified form in which the serrations may be omitted from the wedge and the blade without sacrificing adjustability. In this construction, the slot 32 is formed with inclined front and back walls 34 and 36 similar to the previously described construction. The bottom of the slot 37, however, is flat and without endwise inclination. The bottom of the blade element 38 is provided with an inclined slot 40 for the reception of a wedge 42. The incline of this slot is preferably less than that used with the serrated embodiment. An angle of about 3° is preferred, though this may be varied a degree each way, more or less, without affecting the operation. By placing the cutter 38 in the slot, the wedge 42 may be driven between it and the bottom of the slot to wedge the blade upwardly into tight contact with the inclined walls 34 and 36. The blade may be readily adjusted endwise in the slot by removing the wedge and replacing it after the blade has been shifted.

The third modification illustrated in Figures 15 and 16 is very similar to that of Figures 1 and 2. It has the same front and back slot walls and the same blade, but the groove 20' is of cylindrical form. The wedge has a cylindrical mating surface which permits the wedge to align itself accurately to the serrations of the blade and does not require close tolerances to be maintained in the conformation of the wedge and the wedge slot.

It will thus be seen that the present invention provides an improved cutter in which vibration is greatly reduced with a stronger blade construction and a stronger body construction with respect to all the loads to which it is subjected. In addition, the cutting forces are received in a direction that tightens the component parts. When assembled, the cutter offers no cracks or crevasses to gather chips and provides, in effect, a nearly solid cutting unit with advantages of an inserted blade cutter. There are no tapped holes or screws required and the blade receiving slots have simple flat surfaces which are easily produced to close tolerances. Likewise, the blade and wedge are of simple construction readily machined with the required accuracy.

These advantages have resulted in a cutter which, in competitive tests with the best cutters on the market, have produced two parts per cutter grind to every one produced by the best available previous designs. While it is particularly adapted to use with the hard sintered carbide cutting materials since it permits their high speed and heavy feed possibilities to be more fully utilized, it is also of marked advantage when using cutting materials of other types.

It will be understood that while the embodiments shown in the drawings and described above all relate to a cutter inserted axially of a circular cutter body, the invention pertains as well to location of the cutters radially in a face of a circular cutter or to location in cutter bodies having shapes other than that shown.

I claim:

1. In an inserted blade cutter, the combination of a body having a slot with front, back and bottom walls, the bottom wall being the wall away from the opening, the front and back walls being on either side of the opening, a blade with top, front, back, and bottom surfaces, the blade being positionable such that the front and back surfaces are in wedge relation to the front and back surfaces of the slot, said slot and blade having flat sides at the front and back converging in the direction of the slot opening and the top of the blade, and being equally spaced endwise, the bottom wall of the slot having at least a portion sloping toward one end of the slot, the bottom surface of the blade being relatively flat and so positioned with respect to the front and back surfaces of the blade that any plane parallel to the blade bottom cuts the front and back surfaces in parallel lines, a wedge to contact and underlie the blade in the slot, the bottom surface of the wedge to have a wedge relation to the sloping portion of the slot bottom, the top surface of the wedge being disposed at an angle to the bottom surface of the wedge and teeth extending fully across and spaced from end to end of said top surface, teeth on the bottom of the blade to engage the teeth on the wedge to prevent endwise slipping between the blade and wedge in assembly, the contacting surfaces transmitting the full load thrust of wedge force and cutting load to the bottom of said slot when said wedge and blade are assembled endwise as a unit into the cutter body slot.

2. In an inserted blade cutter, the combination of a body having a slot with front, back and bottom walls, the bottom wall being the wall away from the opening, the front and back walls being on either side of the opening, a blade with top, front, back, and bottom surfaces, the blade being positionable such that the front and back surfaces are in wedge relation to the front and back surfaces of the slot, said slot and blade having flat sides at the front and back converging in the direction of the slot opening and the top of the blade, and being equally spaced endwise, the bottom wall of the slot having at least a portion sloping toward one end of the slot, the bottom surface of the blade being relatively flat and so positioned with respect to the front and back surfaces of the blade that any plane parallel to the blade bottom cuts the front and back surfaces in parallel lines, a wedge to contact and underlie the blade in the slot, the bottom surface of the wedge to have a wedge relation to the sloping portion of the slot bottom, the top surface of the wedge being disposed at an angle to the bottom surface of the wedge and being fully serrated transversely, the serrations extending from end to end, the bottom of the blade being serrated for full contact with the serrated surface of said wedge to effect positive engagement between the blade and wedge, the mated serrated surfaces being the sole load transmitting surfaces between the blade and the bottom of the slot.

3. In an inserted blade cutter, the combination of a body having a slot with front, back and bottom walls, the bottom wall being the wall away from the opening, the front and back walls being on either side of the opening, a blade with top, front, back, and bottom surfaces, the blade being positionable such that the front and back surfaces are in wedge relation to the front and back surfaces of the slot, said slot and blade having flat sides at the front and back converging in the direction of the slot opening and the top of the blade, and being equally spaced endwise, the bottom wall of the slot having at least a portion sloping toward one end of the slot, the bottom surface of the blade being relatively flat and so positioned with respect to the front and back surfaces of the blade that any plane parallel to the blade bottom cuts the front and back surfaces in parallel lines, a wedge to contact and underlie the blade in the slot, the bottom surface of the wedge to have a wedge relation to the sloping portion of the slot bottom, the top surface of the wedge being disposed at an angle to the bottom surface of the wedge and adapted to mate with a portion of the blade bottom, at least one of mating surfaces having one or more projections to be received in complemental recesses by the other of the mating surfaces to permit endwise adjustment but to lock the surfaces against endwise relative movement when assembled, the mated surfaces being the sole load transmitting surface between the blade and the bottom of the slot.

4. In an inserted blade cutter, the combination of a body having a slot with front, back and bottom walls, the bottom wall being the wall away from the opening, the front and back walls being on either side of the opening, a blade with top, front, back, and bottom surfaces, the blade being positionable such that the front and back surfaces are in wedge relation to the front and back surfaces of the slot, said slot and blade having flat sides at the front and back converging in the direction of the slot opening and the top of the blade, and being equally spaced endwise, the bottom surface of the blade being relatively flat and so positioned with respect to the front and back surfaces of the blade that any plane parallel to the blade bottom cuts the front and back surfaces in parallel lines, a locking arrangement for said blade to furnish simultaneous outward locking force, positioning, and support to said blade against work thrust comprising a wedge to contact and underlie the bottom of the blade longitudinally on a sloping portion in the bottom of the slot at an angle to the blade bottom and to any plane cutting the front and back of the slot in parallel lines, the sloping portions ending at an end of the slot, alternate transverse protuberances and recesses on the contacting surfaces of said blade and wedge, mating fully across and endwise of the blade contacting surface of said wedge to permit endwise adjustment but to lock against relative endwise movement between said wedge and said blade when inserted together in the slot, the blade, slot, and wedge being formed initially whereby a predetermined location of the wedge relative to the body provides required locking force of the blade regardless of the endwise adjustment between the blade and wedge prior to insertion.

5. In an inserted blade cutter, the combination of a body having a slot with front, back, and bottom walls, the bottom wall being the wall away from the opening, the front and back walls being on either side of the opening, a blade with top, front, back and bottom surfaces, the blade being positionable in the slot such that the front and back surfaces are in wedge relation to the front and back surfaces of the slot and the bottom surface of the blade is spaced upwardly from the bottom wall of the slot, said slot and blade having flat sides at the front and back converging in the direction of the slot opening and the top of the blade, and being equally spaced endwise, the bottom wall of the slot having at least a portion sloping toward one end of the slot, the bottom surface of the blade being relatively flat and so positioned with respect to the front and back surfaces of the blade that any plane parallel to the blade bottom cuts the front and back surfaces in parallel lines, a wedge to contact and underlie the blade in the slot to serve as the sole contact and spacing means between the blade and the bottom of the slot, the bottom surface of the wedge to have a wedge relation to the sloping portion of the slot bottom, the top surface of the wedge being disposed at an angle to the bottom surface of the wedge and adapted to mate with a portion of the blade bottom, at least one of mating surfaces having one or more projections to be received in complemental recesses by the other of the mating surfaces to permit endwise adjustment but to lock the surfaces against endwise relative movement when assembled, the mated surfaces being the sole load transmitting surfaces between the blade and the bottom of the slot, the blade, slot, and wedge being formed initially whereby a predetermined location of the wedge relative to the body provides required locking force of the blade regardless of the endwise adjustment between the blade and wedge prior to insertion.

6. In an inserted blade cutter having a body provided with slots having front and back walls adjacent a surface opening, and a bottom wall opposite the openings, blades in said slots, the front and back walls of both the slots and the blades diverging toward the bottoms, the bottom of the blade being spaced from the bottom of the slot in assembled relation, the front and back walls each having the same angular relation to the bottom of the blade throughout their length such that a plane cutting the blade parallel to the bottom of the blade intersects the front and back side walls in parallel lines, at least a portion of the bottom of the slot sloping endwise toward the blade bottom, a wedge in adjustably fixed contact with the bottom of the blade to serve as the sole spacer and load carrying means between the bottom of the blade and the bottom of the slot, the wedge being longitudinally slidable with the blade until locked against the sloping bottom of the slot.

7. In an inserted blade cutter having a body provided with slots having front and back walls adjacent a surface opening, and a bottom wall opposite the openings, blades in said slots, the front and back walls of both the slots and the blades diverging toward the bottoms, the bottom of the blade being spaced from the bottom of the slot in assembled relation, the front and back walls each having the same angular relation to the bottom of the blade throughout their length such that a plane cutting the blade parallel to the bottom of the blade intersects the front and back side walls in parallel lines, at least a portion of the bottom of the slot sloping endwise toward the blade bottom, a wedge to lie in adjustably fixed contact with the bottom of the blade, interfitting formations fully covering the contacting surfaces of the wedge and the blade bottom to effect such adjustable fixed contact, the wedge serving as the sole spacer and load carrying means between the bottom of the blade and the bottom of the slot, the wedge being longitudinally slidable with the blade until locked against the sloping bottom of the slot.

8. A blade for an inserted blade cutter comprising an elongated body having a base surface adapted to fixedly receive in lengthwise adjustable positions a securing wedge thereagainst, the side edges of said base surface being parallel, said body having a top surface opposite to and spaced from said base surface upon a portion of which a cutting edge is provided, said body having front and rear side surfaces contiguous to said base surface at the side edges thereof, said side surfaces being plane throughout their extent, and adapted to have surface to surface wedging contact with complementary plane wall surfaces of a holder, said side surfaces converging toward and joining said top surface, along its side edges, and transverse serrations formed fully across the bottom surface of said blade, extending from end to end thereof, said serrations being the sole support and positioning means between the bottom of the blade and a holder.

BERNARD K. STUBER.

REFERENCES CITED

The following references are of record in the file of this patent:

UNITED STATES PATENTS

| Number | Name | Date |
|---|---|---|
| 1,736,210 | Miller | Nov. 19, 1929 |
| 2,150,286 | Miller | Mar. 14, 1939 |
| 2,189,801 | Johnson | Feb. 13, 1940 |
| 2,382,510 | Seiter | Aug. 14, 1945 |
| 1,765,172 | Miller | June 17, 1930 |
| 2,101,085 | Miller | Dec. 7, 1937 |
| 2,309,410 | Miller | Jan. 26, 1943 |
| 2,351,491 | Connell | June 13, 1944 |